J. B. UNDERWOOD.
FRUIT CORER AND SLICER.
APPLICATION FILED FEB. 17, 1922.
1,431,854.
Patented Oct. 10, 1922.
2 SHEETS—SHEET 2.
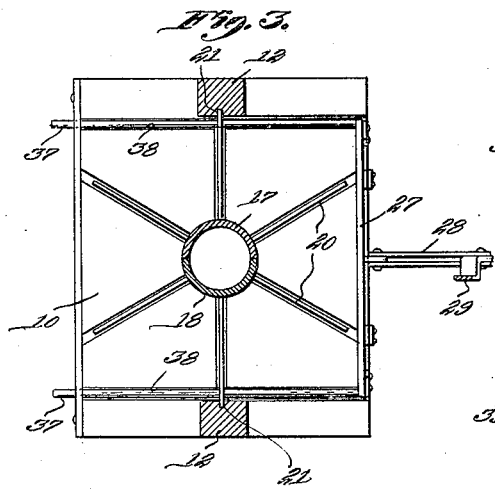
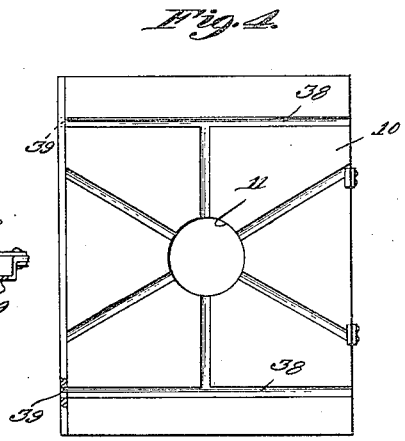
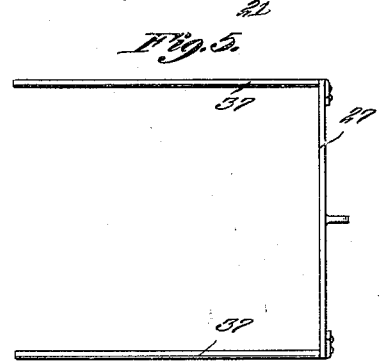
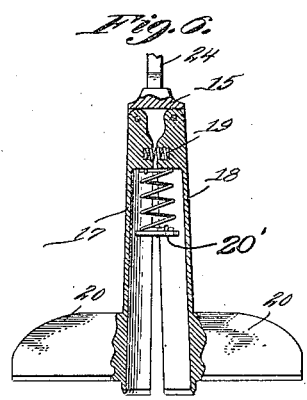
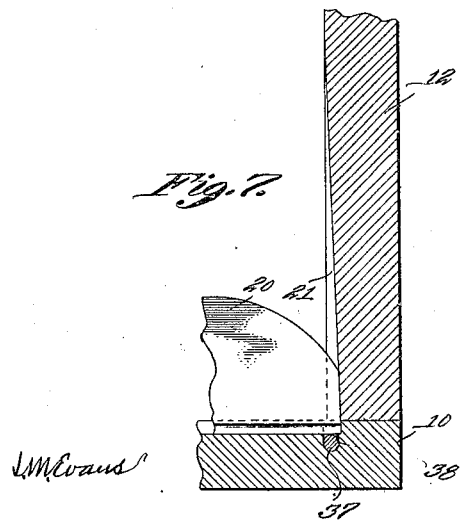
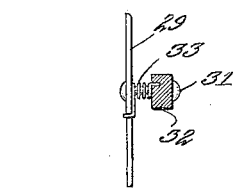
James B. Underwood
INVENTOR
BY Victor J. Evans
ATTORNEY
WITNESS:

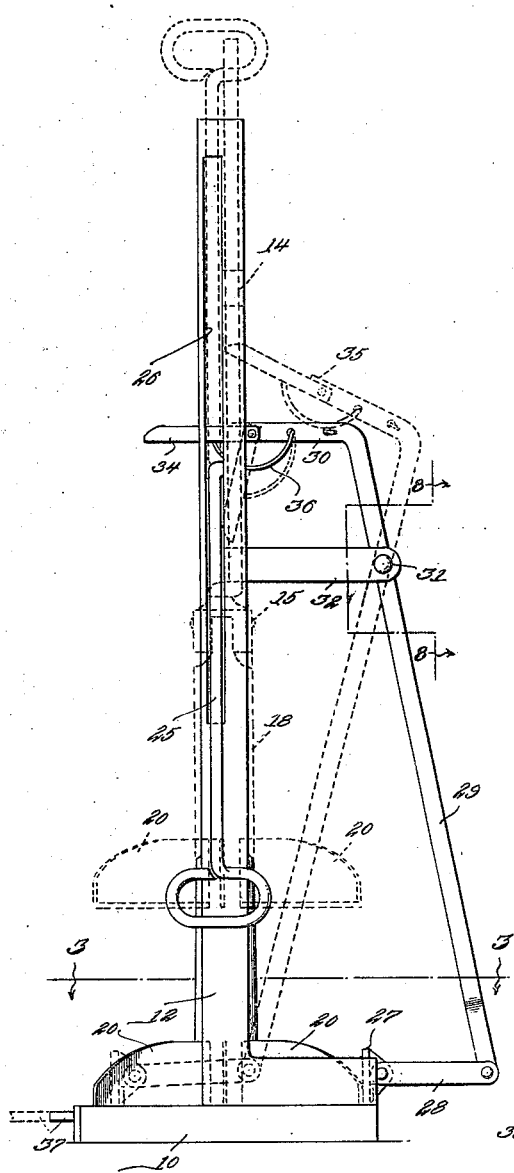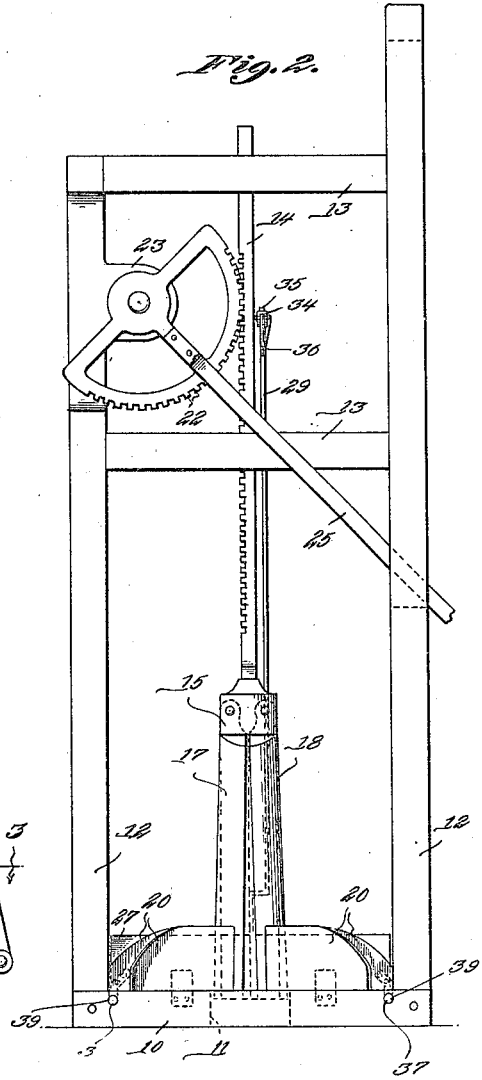

Patented Oct. 10, 1922.

1,431,854

UNITED STATES PATENT OFFICE.

JAMES B. UNDERWOOD, OF DUNMOR, KENTUCKY, ASSIGNOR OF ONE-FOURTH TO JOHN F. ALLISON AND ONE-FOURTH TO JESSIE O. HAYES, BOTH OF DEERLICK, KENTUCKY.

FRUIT CORER AND SLICER.

Application filed February 17, 1922. Serial No. 537,198.

*To all whom it may concern:*

Be it known that I, JAMES B. UNDERWOOD, a citizen of the United States, residing at Dunmor, in the county of Muhlenberg and State of Kentucky, have invented new and useful Improvements in Fruit Corers and Slicers, of which the following is a specification.

This invention relates to a machine for coring and slicing fruit, and has for one of its chief characteristics, the provision of a machine by which results may be accomplished with a single stroke of the operating lever.

Another object of the invention resides in a construction whereby the core is separated from the other component parts of the object sliced at the completion of the operating stroke.

A further object of the invention resides in the provision of means operable incident to the active stroke of the lever, for moving the sliced fruit from the base on which the fruit is supported to be sliced.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a side elevation of the machine showing different positions of the blades and their associated parts.

Figure 2 is a view taken at a right angle to Figure 1.

Figure 3 is a sectional view taken on line 3—3 of Figure 1.

Figure 4 is a plan view of the base.

Figure 5 is a fragmentary plan view of the parallel guides.

Figure 6 is a detail view partly in section of the core.

Figure 7 is a fragmentary view, partly in section of a portion of the base and one of the standards showing the relative position of one of the blades with respect to the standard.

Figure 8 is a sectional view taken on line 8—8 of Figure 1.

The machine forming the subject matter of this invention includes a base 10 which is formed with a central opening 11 for a purpose to be presently described.

Rising from the base are spaced parallel standards 12 which are connected together by cross bars 13, the latter having alined openings through which slides a rack bar 14. Supported by the lower end of the rack bar is a bracket 15 whch is slotted or bifurcated as shown, and pivoted within this bracket are the respective sections 17 and 18 of the corer. Each section is of semi-cylindrical formation, so that the sections unitedly define a tubular member adapted to penetrate the article of fruit for the purpose of removing the core therefrom. Arranged between and connected with the said sections of the corer is a spring 19 which has a tendency to slightly spread or separate the sections, and functions for this purpose at the completion of the operating stroke of the rack bar, to effect a release of the core as will be readily understood. Arranged between the sections 17 and 18 is a spring pressed disk or the like 20' which operates to assist in operating the core from the sections 17 and 18 as will be readily understood. Radiating from each section of the corer is a plurality of blades 20 which slice the article of fruit supported by the base, and any number of these blades may be used as desired without departing from the spirit of the invention. One blade of each section, or in other words, those blades which move between the standards 12 operate in grooves 21 formed in the standards 12, and in this manner the parts are held in proper position relatively. Each groove 21 is slightly tapered, with the deepest part of the groove adjacent the lower end of the standard, so that when the core has penetrated the article of fruit, the respective sections 17 and 18 thereof are allowed to spread or separate the requisite distance under the influence of the spring above referred to, thereby releasing the core and allowing it to drop through the central opening of the base. Manifestly, with each operation the core of the particular article of fruit severed is separated from the component parts thereof which have been sliced through the instrumentality of the blades 20.

While any suitable means may be employed to operate the rack bar 14, I preferably employ a toothed segment indicated at 22 and fulcrumed on one of the standards as at 23. The teeth of this segment mesh with the teeth of the rack bar 14 so as to control the movements of the latter. Projecting from the toothed segment is an operating lever 25 which operates in a slot 26 formed in the other standard. Apparently, when the lever 25 is moved upwardly, it elevates the corer so that an article of fruit can be properly positioned upon the base to be sliced and cored. When the lever is depressed, the rack bar is moved downwardly, forcing the corer through the center of the article of fruit to remove the core therefrom, and at the same time cut the article of fruit into a number of slices, depending of course upon the number of blades embodied in the construction of the machine. As above stated, the respective sections of the corer are slightly spread or separated at the completion of the down stroke of the rack bar, so as to release the core and permit it to gravitate through the opening 11 in the base, thereby separating it from the remainder of the fruit.

Now, for the purpose of removing the sliced fruit from the base, incident to the return of the corer to its normally elevated position, I provide an element 27 which is arranged transversely of the base and mounted to move across the base. As this element moves across the base, it carries with it, the sliced particles of fruit, moving them from the base into a suitable receptacle (not shown) arranged adjacent the base. This element 27 is connected with the lower end of an angularly shaped rod, through the instrumentality of a link 28, the latter being pivotally connected with both the element 27 and said rod. This rod is shaped to provide a vertically disposed branch 29 and an obliquely disposed branch 30, the rod being fulcrumed as at 31 at the point of juncture of the respective branches. The rod is supported by an arm 32 projecting from one of the cross pieces 13. Surrounding the pivot 31 of said rod is a coiled spring 33 having one end secured to the branch 29 of the angularly shaped rod, the spring operating to normally hold the element 27 at one side of the opening 11 of the base. Projecting from the free end of the obliquely disposed branch 30 of said rod is a short pivoted section 34 which is of substantially U-shaped formation in cross section. This section 34 is slotted at one end to straddle the adjacent end of said rod upon which it is pivotally mounted. The adjacent end of said rod is formed with a finger 35 which overlies the pivoted section 34. This section 34 is connected to one end of a spring 36, the opposite end of which is carried by the adjacent branch of the angular shaped rod, the spring 36 holding the pivoted section normally in the position illustrated in Figure 1. This pivoted section is disposed in the path of the operating lever to be engaged by the latter incident to both its upward and downward movement. When the lever is moved upwardly, subsequent to slicing and coring the article of fruit supported upon the base, the lever contacts the pivoted section 34 of said rod, but as the latter cannot be moved with relation to said rod it provides a rigid connection between the lever and said rod, thus moving the rod upon its pivot in a direction which moves the element 27 across the base 10 for the purpose specified. During the continued forward movement of the lever, the latter is moved out of engagement from the pivoted section 34, thereby allowing the spring 33 to return the element 27 and its associated parts to normal position. When the lever is moved downwardly upon its operating stroke, it again contacts the pivoted section 34, but in this instance, the pivoted section is allowed to move independently of the rod, against the tension of the spring 36, so that after the lever passes the pivoted section 34, the latter is returned to its normal position under the influence of the spring 36. The element 27 is guided in its movements through the medium of the spaced parallel guides 37 which project forwardly from the opposed ends of the element 27 and operate in grooves 38 from the base 10, and also passed through openings 39 which are formed in one side of the base in a line with said grooves. The machine in its entirety is very efficient in operation for the purpose intended, and can be conveniently manipulated so that a large quantity of fruit can be cored and sliced in a given time.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

1. A fruit slicing and coring machine comprising a base, a rack bar mounted to reciprocate above the base, a corer depending from said bar, cutting blades carried by said corer, means for reciprocating said rack bar, means for removing the sliced fruit from the base incident to the upward movement of said corer.

2. A fruit slicing and coring machine comprising a base having a central opening, a rack bar arranged to reciprocate above the base, a corer depending from said bar and including pivoted sections, cutting blades carried by the respective sections, means for reciprocating the rack bar, means for holding said sections of the core closely related during the down stroke of said rack bar, and means for slightly spreading said sections at the completion of said down stroke whereby said sections release the core and allow it to gravitate through said central opening.

3. A fruit slicing and coring machine of the character described comprising a base having a central opening, a rack bar arranged to reciprocate above the base, means for reciprocating said bar, a corer depending from said bar and including pivoted sections, means for holding said sections closely related during the down stroke of said rack bar, cutting blades carried by said sections of the corer, means for slightly spreading said sections at the completion of said down stroke of the corer, whereby to release said core and allow it to gravitate to said opening in the base, and means for moving the sliced particles of fruit off the base incident to the upward movement of the corer.

4. A fruit slicing and coring machine comprising a base having a central opening, a rack bar arranged to reciprocate above the base, a corer depending from said rack bar and including relatively movably sections, cutting blades carried by said sections, means for reciprocating said rack bar, means for holding said sections closely associated during the down stroke of said rack bar, yieldable means for slightly spreading said sections at the completion of said down stroke to separate the core from said sections and allow it to gravitate through said opening, an element movable across the base for removing the sliced fruit therefrom, means for moving said element in one direction incident to the upward movement of the rack bar, and means for moving said element in the other direction prior to the downward movement of said rack bar.

5. A fruit slicing and coring machine comprising a base having a central opening, a rack bar mounted to reciprocate above the base, a corer depending from the rack bar and including pivoted sections, means for holding said sections closely associated during the down stroke of the rack bar, means for reciprocating said rack bar, yieldable means for slightly spreading said sections at the completion of the down stroke of said rack bar, whereby to release the corer and to allow it to gravitate through said opening, an element movable across the base in one direction to remove the sliced fruit therefrom, means actuated incident to the upward movement of the rack bar for moving said element for the purpose specified, and means for automatically returning said element to its normal position prior to the down stroke of said rack bar, and means for guiding the element in its movements.

6. A fruit slicing and coring machine comprising a base, standards rising therefrom, said standards having tapered grooves, a rack bar arranged to reciprocate above the base, said base having a central opening, a corer depending from the rack bar and including pivoted sections, blades carried by said sections, one blade of each section operating within the grooves of the standards, means for reciprocating said rack bar, said blades operating within the groove holding said sections associated during the down stroke of said rack bar, and yieldable means between said sections and operating to slightly spread the latter at the completion of said down stroke for the purpose specified.

7. A fruit slicing and coring machine having an opening therein, a rack bar arranged to reciprocate above the base, a corer depending from said rack bar, blades carried by said corer, means for reciprocating said rack bar and including an operating lever, an element movable across said base and operable to move the fruit therefrom, an angular shaped rod terminally connected with said element, said rod being fulcrumed at a point between its ends, means projecting from the opposite end of said rod and disposed in the path of said lever, whereby said rod is moved upon its pivot, to move said element across the base incident to the upward movement of said lever, and means for automatically returning the said element and its associated parts to normal position prior to the down stroke of said rack bar.

In testimony whereof I affix my signature.

JAMES B. UNDERWOOD.